(12) United States Patent
Wilfert

(10) Patent No.: US 8,998,466 B2
(45) Date of Patent: Apr. 7, 2015

(54) INTERIOR LIGHTING FOR A VEHICLE, METHOD FOR PROVIDING THE INTERIOR LIGHTING IN THE VEHICLE AND VEHICLE WITH THE INTERIOR LIGHTING

(75) Inventor: Ralf Wilfert, Buettelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 13/439,960

(22) Filed: Apr. 5, 2012

(65) Prior Publication Data

US 2012/0257401 A1 Oct. 11, 2012

(30) Foreign Application Priority Data

Apr. 8, 2011 (DE) .......................... 10 2011 016 420

(51) Int. Cl.
| | | |
|---|---|---|
| *F21V 7/22* | (2006.01) | |
| *F21V 8/00* | (2006.01) | |
| *B60Q 3/02* | (2006.01) | |
| *B60Q 3/00* | (2006.01) | |
| *F21V 7/00* | (2006.01) | |

(52) U.S. Cl.
CPC .............. *B60Q 3/0283* (2013.01); *G02B 6/006* (2013.01); *G02B 6/0068* (2013.01); *B60Q 3/0286* (2013.01); *B60Q 3/004* (2013.01); *G02B 6/0095* (2013.01); *G02B 6/0041* (2013.01)

(58) Field of Classification Search
CPC .... B60Q 3/044; B60Q 3/0203; B60Q 3/0286; B60Q 3/0283; B60Q 3/005; B60Q 3/0253; B60Q 3/02; F21S 48/2281; F21S 48/1241; F21S 48/2268; F21S 48/00; F21S 8/10
USPC .......... 362/487–492, 509–522, 555, 615–629
See application file for complete search history.

(56) References Cited

U.S. PATENT DOCUMENTS

| | | |
|---|---|---|
| 2,974,250 A | 3/1961 | Helmut |
| 6,890,089 B2 | 5/2005 | Haering et al. |
| 7,284,886 B2 | 10/2007 | Chen et al. |
| 7,699,512 B2 | 4/2010 | Mueller et al. |
| 7,862,220 B2 | 1/2011 | Cannon et al. |
| 8,162,519 B2 | 4/2012 | Salter et al. |
| 2001/0033135 A1* | 10/2001 | Duggal et al. ................. 313/506 |
| 2010/0214795 A1* | 8/2010 | Salter et al. .................... 362/488 |

FOREIGN PATENT DOCUMENTS

| | | |
|---|---|---|
| DE | 10341739 A1 * | 3/2005 |
| DE | 102004007555 A1 | 9/2005 |

(Continued)

*Primary Examiner* — Karabi Guharay
*Assistant Examiner* — Nathaniel Lee
(74) *Attorney, Agent, or Firm* — Ingrassia Fisher & Lorenz, P.C.

(57) ABSTRACT

An interior lighting for a vehicle includes, but is not limited to a coupling-out zone for illumination of the vehicle interior, which includes, but is not limited to a lighting device. The lighting device includes, but is not limited to a light source that is configured to produce light and an optical fiber, into which the light can be coupled in or is coupled in. The optical fiber is configured to couple out the light extensively in the at least one coupling-out zone, and includes, but is not limited to an auxiliary lighting for producing an auxiliary light which is also configured for the illumination of the vehicle interior. The auxiliary lighting emits the auxiliary light starting from a side of the at least one optical fiber facing away from the vehicle interior in a trans-illumination zone through the optical fiber into the interior.

20 Claims, 4 Drawing Sheets

(56) References Cited

FOREIGN PATENT DOCUMENTS

| | | |
|---|---|---|
| DE | 102004044035 A1 | 3/2006 |
| DE | 102005025555 A1 | 12/2006 |
| DE | 102006012606 A1 | 11/2007 |
| DE | 102009060355 A1 | 6/2011 |
| DE | 102010030660 A1 | 12/2011 |

* cited by examiner

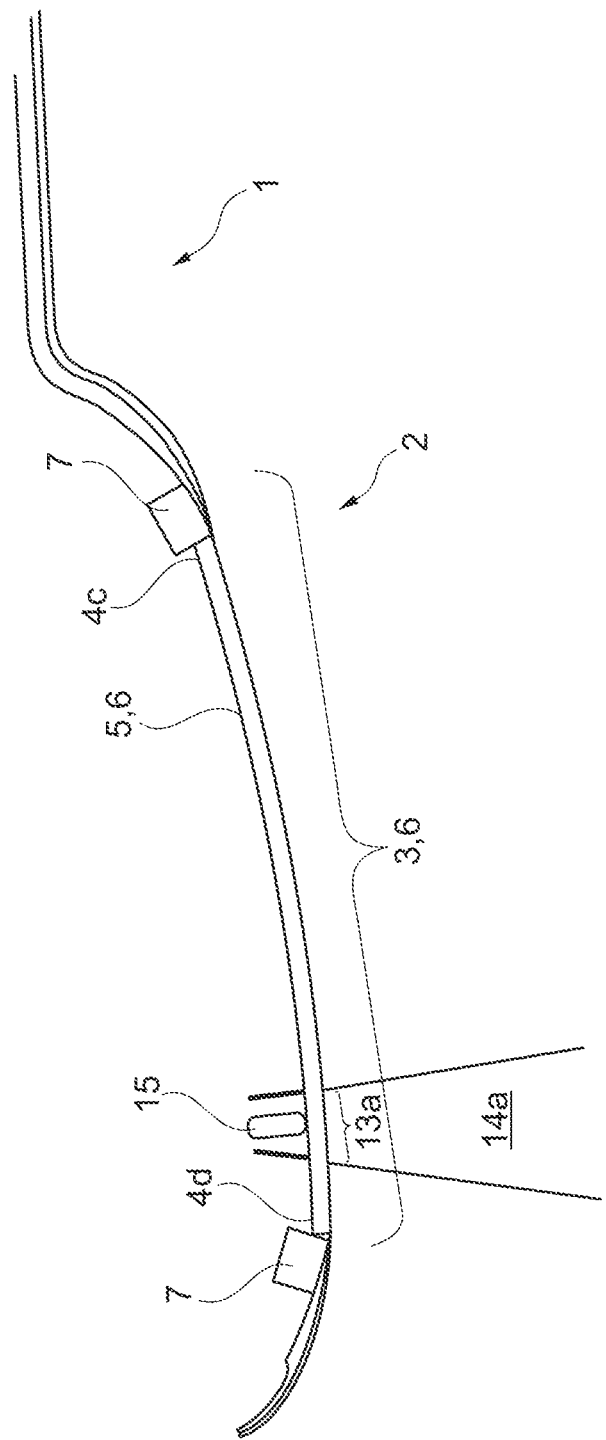

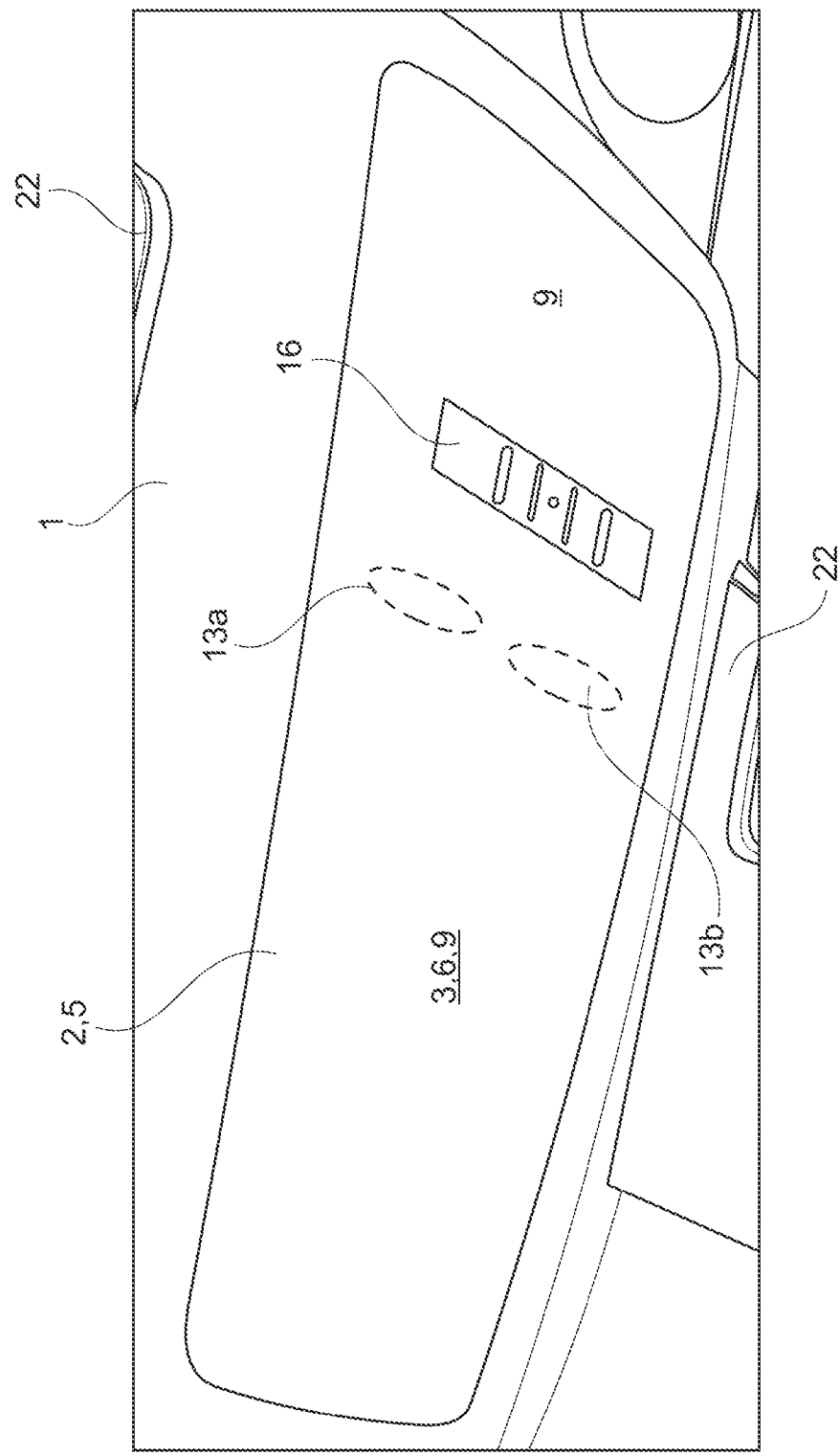

INTERIOR LIGHTING FOR A VEHICLE, METHOD FOR PROVIDING THE INTERIOR LIGHTING IN THE VEHICLE AND VEHICLE WITH THE INTERIOR LIGHTING

CROSS-REFERENCE TO RELATED APPLICATION

This application claims priority to German Patent Application No. 10 2011 016 420.0, filed Apr. 8, 2011, which is incorporated herein by reference in its entirety.

TECHNICAL FIELD

The technical field generally relates to an interior lighting for a vehicle, in particular a ceiling lighting.

BACKGROUND

Vehicles of usual design have a plurality of interior lights. Thus, in addition to a ceiling light between the driver and passenger seat, it is by now common to also integrate foot well lights, glove box lights, etc., in the vehicle. The interior lights on the one hand fulfill functional purposes in order, for example, to facilitate the reading of maps or finding items in a glove box, or on the other hand, creative purposes such as the lighting design inside the vehicle. In many cases, however, these two tasks cannot be separated since an aesthetic interior lighting at the same time imparts to the user of the vehicle a certain security in the vehicle and therefore again implements a functional purpose.

DE 10 2004 044 035 A1 describes a trim part for the vehicle interior made of a translucent plastic material, which is configured as a reading light under the roof liner. The trim part comprises an optical fiber, which is illuminated by concealed LEDs. For coupling out the light, structures are incorporated in the surface of the optical fiber or hollow locations, foreign bodies, and/or additives are present in the material.

It is at least one object to propose an interior lighting and a vehicle with the interior lighting, which implements an improved function with a simplified scope for integration. In addition, other objects, desirable features and characteristics will become apparent from the subsequent summary and detailed description, and the appended claims, taken in conjunction with the accompanying drawings and this background.

SUMMARY

Interior lighting for a vehicle is provided where the vehicle is preferably configured as a motor vehicle, in particular as an automobile. In other embodiments, the vehicle can also be implemented as a truck, a bus, in particular a tour bus or another mobile. The interior lighting comprises at least one coupling-out zone, which is configured for coupling out light for the lighting and/or illumination of the vehicle interior. As a result of the lighting, the vehicle can be functionally brightened in order, for example, to provide sufficient light for reading in the vehicle interior or illuminated in order to create specific artistic or aesthetic or decorative effects to increase the vehicle comfort and the vehicle safety. The at least one coupling-out zone can extend all over the visible side of the interior lighting, the coupling-out zone preferably extends over at least approximately 70%, preferably at least approximately 80%, and in particular at least approximately 90% of the visible side of the interior lighting. The visible side is designated as the zone perceived by the user from the vehicle interior. In modified embodiments a plurality of coupling-out zones can also be provided in the interior lighting.

The interior lighting comprises at least one lighting device, which in turn comprises one or more light sources for producing light and at least one optical fiber, into which the light of the light source can be coupled in or is coupled in. The optical fiber is disposed and/or configured in relation to the light source and the at least one coupling-out zone such that this conveys the light from the light source into the at least one coupling-out zone in particular by means of total reflection at the interfaces of the optical fiber and couples it out there.

The optical fiber is configured to couple out the light extensively in the at least one coupling-out zone. The light is preferably emitted homogeneously or all over the entire surface of the coupling-out zone. In particular, the optical fiber emits the light diffusely in the coupling-out zone with a uniform light intensity and/or not in a punctiform manner in the interior.

The surface extension of the coupling-out zone is particularly preferably disposed in alignment with the direction of propagation of the light in the optical fiber from the lighting device to the coupling-out zone and/or with the surface extension of the interior lighting and/or the vehicle roof. The interior lighting additionally comprises an auxiliary lighting for producing an auxiliary light which is also configured for the lighting and/or illumination of the vehicle interior. In particular, the auxiliary lighting is provided separately and/or additionally to the at least one lighting device.

The auxiliary lighting is disposed and/or configured constructively in the interior lighting such that this auxiliary lighting emits the auxiliary light starting from a side of the at least one optical fiber facing away from the vehicle interior in a trans-illumination zone of the optical fiber through the at least one optical fiber into the interior. While the light of the light source is thus conveyed via the optical fiber to the coupling-out zone, the auxiliary lighting does not use its optical fiber function. On the contrary the auxiliary light is injected from a rear side of the optical fiber and leaves this optical fiber in the trans-illumination zone on the front side. Consequently, the path of the auxiliary light inside the optical fiber depending on the thickness of the optical fiber is less than approximately 3 cm, preferably less than approximately 2 cm, and in particular less than approximately 1 cm. In particular the direction of injection of the auxiliary light into the optical fiber is the same as the direction of emission from the optical fiber.

Consideration is given that a very harmonious and high-quality illumination of the interior can be achieved by using optical fibers from which light is coupled out extensively. However, the possibilities for this type of illumination are limited. Consequently, in some areas of application it can be advantageous if auxiliary lights are used to selectively light areas in the interior. Usually, such auxiliary lights are placed next to usual interior lights and form separate and separated light sources. However, this known embodiment utilizes an increased expenditure on integration since a corresponding installation space must be provided. In addition, lines of intersection or intermediate zones are provided between the interior lighting and the auxiliary lighting. The configuration where the auxiliary lighting emits the auxiliary light through the optical fiber into the interior and thus, when viewed from the interior, can be disposed behind the optical fiber and consequently behind the lighting device, on the other hand, allows the auxiliary lighting to be integrated in the interior lighting and thereby avoid the said disadvantages.

Consequently, as advantages mention may be made of the fact that the interior lighting has an extensive and possibly undivided visible side with an extensive coupling-out zone, where the auxiliary light is arranged concealed or set back behind the optical fiber so that a common installation space can be used for the at least one lighting device and the auxiliary lighting. In addition, lines of intersection or separating zones between the coupling-out zone and the trans-illumination zone can be dispensed with, which in additional to aesthetic advantages, also promotes interior surfaces which are easier to care for and a simplified installation of the interior lighting.

In an embodiment, the auxiliary lighting emits the auxiliary light through the coupling-out zone into the interior. In other words, the trans-illumination zone and the coupling-out zone are arranged to overlap. It is thereby possible that when the light source is exclusively activated, only the coupling-out zone emits light, when the auxiliary lighting is exclusively activated only auxiliary light shines into the interior and when the light source and auxiliary lighting are activated jointly, the light and the auxiliary light are delivered in an overlapping manner into the interior. The described activation alternatives are functional properties of the interior lighting, which cannot be seen in the interior lighting at first glance as a result of the concealed arrangement of the auxiliary lighting in embodiments.

In an embodiment, the optical fiber is configured to be plate-like in the trans-illumination zone and/or in the coupling-out zone. In a practically relevant realization, the optical fiber is configured as a curved plate. The auxiliary lighting is placed or disposed on the rear side of the plate or the plate-like region. In this embodiment, the auxiliary light shines through the plate thickness. The at least one light source is preferably disposed on a side edge, front side, or narrow side of the optical fiber or the plate so that the light is conveyed in the direction of the surface extension of the optical fiber or the plate and is coupled out into the interior in the coupling-out zone. This specific example again underlines the basic idea of the invention that the light of the light source is guided via the optical fiber to the coupling-out zone and is there coupled out extensively. Particularly preferably the light and/or the auxiliary light radiates from the plane and/or the surface of the trans-illumination zone or the coupling-out zone.

In a constructive embodiment, the interior lighting is configured as a ceiling lighting, where the auxiliary lighting is configured as a reading lamp. Generally speaking, the lighting device and the auxiliary lighting have different functions. The ceiling lighting supplies the interior with a rather diffuse light whereas the auxiliary lighting allows a directional emission of the auxiliary light. Particularly, the directional emission is directed onto the seat area of a driver's seat or a passenger seat. It is also possible that the interior lighting has two auxiliary lights which are each configured as a reading lamp for the driver or passenger.

In particular, the optical fiber can be configured as a main body of the ceiling lighting or the interior lighting, where the visible side of the ceiling lighting is formed by the optical fiber. In a continuation of the invention, a housing for the ceiling lighting can be dispensed with since the optical fiber forms or substitutes for the housing. In particular, mechanical interfaces such as, for example, through openings, detents, fastening tabs, etc. can be formed in or on the optical fiber for fastening the ceiling lighting in the vehicle.

In one possible embodiment of the interior lighting, the optical fiber is coated and/or covered with decorative material. In this embodiment the decorative material is configured to be permeable to light if desired so that the at least one coupling-out zone is covered by the decorative material and illuminates the interior through this or the covering with decorative material is exposed in the area of the coupling-out zones in order to ensure an undisturbed passage of light.

The optical fiber material can preferably be formed as a light-conducting plastic, for example, as a thermoplastic such as polymethylmethacrylate (PMMA) or polycarbonate (PC). These thermoplastics can be processed easily in an injection molding process or formed with thermal assistance. Since an intensity, a color, and/or range of the light coupled into the optical fiber depends on a diameter or a ratio of the optical fiber dimensions (e.g., length, width, height) and/or is determined by this, the preferably optical fiber material, in particular as plate articles or after primary forming, has thicknesses of preferably approximately 0.1 to approximately 20 mm, in particular of approximately 1 to approximately 15 mm.

Optionally, the optical fiber can be coated on one or more of its side surfaces in order to achieve certain effects in the emission of light in/into the coupling-out zone(s). The coating can, for example, comprise a mirror layer. Optionally, a color coating and/or an effect coating can be provided in order to determine a light color and/or color the light depending on its angle of incidence.

It is particularly preferable if the optical fiber comprises at least one coupling-out structure introduced into the optical fiber material. Alternatively or optionally additionally, the optical fiber comprises volume scatterers integrated in the optical fiber material. In particular the coupling-out structure and/or the volume scatterers are configured to scatter the light so that it is coupled out extensively in the coupling-out zone.

The light coupled into the optical fiber is preferably refracted and/or deflected or scattered at the coupling-out structure and/or at the volume scatterers as a result of a variously high refractive index of the optical fiber and the coupling-out structure and/or the volume scatterers. The coupling-out structure and/or the volume scatterers are preferably configured to scatter the light in the optical fiber in accordance with the Rayleigh and/or Mie theory and/or geometric optics. In this case, the light can be scattered three-dimensionally or isotropically. In one possible variant, the volume scatterers are distributed homogeneously in the optical fiber material in order to produce a uniform extensive illumination of the interior. Alternatively, the volume scatterers are distributed so that the light is coupled out homogeneously from the coupling-out zone.

In an embodiment, the volume scatterers integrated in the optical fiber material are formed by nanoparticles having an average, preferably arithmetic diameter, of less than approximately 500 nm, preferably less than approximately 300 nm, where, when calculating the arithmetic mean diameter, a sum of all the particle diameters is formed and this sum is divided by the total number of particles. Suitable nanoparticles include, inter alia, ceramic submicron or nanopowders. The volume-equivalent sphere diameter, which gives the diameter of a sphere having the same volume as the nanoparticle being considered, can be used as the diameter. Alternatively, a surface equivalent sphere diameter can be used, where the surface-equivalent sphere diameter is defined as the diameter of a sphere which has the same surface area as the nanoparticle under study. This type of volume scatterer can be distributed such that these are not perceptible for a user so that the optical fiber has a transparent and even water-clear appearance despite the volume scatterers.

The volume scatterers integrated in the optical fiber material can also be formed by air inclusions and/or pigments preferably having an arithmetic mean diameter of less than approximately 3 mm, preferably less than approximately 1 mm but preferably greater than approximately 0.1 mm, in particular greater than approximately 0.5 mm. The pigments are preferably formed from high-refracting ceramic solids such as, for example, titanium (IV) oxide. Combinations of the nanoparticles, the pigments, and/or the air inclusions are also feasible as volume scatterers and optionally additionally as scattering centers within the framework.

In an implementation, the coupling-out structure is formed by notches, roughenings, and/or embossings which in particular are disposed on one or more side surfaces of the optical fiber, e.g., on the underside or upper side. Optionally in addition, one or more scattering centers can be specifically placed in the optical fiber material in order to generate light beams for focusing the light onto a specific interior section in addition to the extensive coupling out or instead of this in the coupling-out zone. The scattering centers can, for example, be formed by a concentrated accumulation of additional ones or the nanoparticles, air inclusions, or pigments in the optical fiber material. For the constructive implementation of the scattering centers, one or more specifically introduced coupling-out structures, in particular suitable prism or lens structures on the underside of the optical fiber facing the interior are also feasible.

It is particularly preferred that the volume scatterers and/or the coupling-out structures and optionally in addition, the scattering centers are not detectable visually or are only slightly visible for the user, where the optical fiber retains or largely retains its transparent or even water-clear appearance. Alternatively or addition, the coupling-out structure and/or the volume scatterers and/or the scattering centers are configured or arranged so that the auxiliary lighting is not, or not perceptibly or not in a function-limiting manner, disturbed in the trans-illumination zone. This configuration also has the advantage that the lighting device and the auxiliary lighting are certainly arranged highly integrated in the interior lighting but do not interfere with each other from the lighting technology viewpoint.

In an embodiment, the injection molding method as primary forming is one of the preferred methods of manufacturing the optical fiber, where the material used for the manufacture is the optical fiber material. This method of manufacture has the advantage that the optical fiber can be fabricated in a precisely fitting manner in one production step.

After the primary forming, forming is also possible to produce the optical fiber. Since the optical fiber material is usually available as plate goods, it can be brought into any shape by thermal forming and formed into the optical fiber of the interior lighting.

It is preferred that the volume scatterers and/or the coupling-out structure and optionally in addition the scattering centers are already introduced into the optical fiber during a primary forming thereof. In particular, the nanoparticles and/or pigments are added to the granular material of the optical fiber material and are processed during the injection molding of the optical fiber or during the manufacture of the plate goods. Alternatively it is possible that after the primary forming or forming, the coupling-out structure located on the side surface(s) is introduced into the optical fiber or the optical fiber material.

The at least one coupling-out zone is formed and disposed on the underside of the associated optical fiber whereby light is emitted in the direction of the interior. The coupling-out zone preferably extends over one or several sub regions or over the entire underside of the optical fiber. The coupling-out zone is preferably formed at a location of the optical fiber where this has a free surface which in particular is configured to be translucent or transparent or water-clear. Optionally on the other hand, the rear side and/or the side surface(s) of the optical fiber except for the trans-illumination zone and the coupling-out zone are preferably blackened so that they are opaque or have a reflecting coating so that the light cannot emerge there. In this case, the coupling-out zone is defined by the non-blackened and/or non-coated areas of the optical fiber.

For example, several coupling-out zones are arranged next to one another spaced apart or in a pattern with respect to one another on the/in the optical fiber. In one possible design the coupling-out zone is only arranged in four corner regions of the optical fiber. Optionally one or more coupling-out zones can be disposed at the center of the optical fiber or extend in a frame-like manner around the optical fiber. Within the framework of the invention, the pattern-like arrangement of the coupling-out zone in particular comprises a grid-like and/or net-like arrangement.

In addition to the partial blackening or reflecting coating of the rear side of the optical fiber, it is also possible to implement the spaced-apart or pattern-like arrangement of the coupling-out zones alternatively or additionally by a corresponding placement of the coupling-out structure or the volume scatterers in/on the optical fiber material. For example, the volume scatterers or the scattering centers are integrated in the optical fiber material in such a manner that the light emerges in the coupling-out zone in spaced-apart or pattern-like manner.

An overall coupling-out zone of the interior lighting, in particular of the ceiling lighting, which is possibly formed by the coupling-out zones arranged at a distance next to one another or in a pattern-like manner or a cohesive overall coupling-out zone preferably has an area of at least approximately 50 cm$^2$, preferably of at least approximately 100 cm$^2$, and especially of at least approximately 150 cm$^2$.

An embodiment provides that the at least one light source is arranged concealed, for example, behind or at the side of the optical fiber. Preferably the at least one light source is arranged not visibly for a user on or in the interior trim. For example, the at least one light source is arranged on one or several of the front sides or side surfaces of the optical fiber. It is also possible that the at least one light source is integrated in the optical fiber. In particular, it is introduced into the optical fiber material, in particular injected therein.

In one possible variant, the at least one light source is arranged at a distance from the coupling-out zone. Preferably in this variant, after coupling into the optical fiber, the light initially passes through a light feed section, e.g., the region which is blackened so that it is impermeable to light or which has a reflecting coating, before it emerges in the translucent or transparent coupling-out zone in order to illuminate the interior.

In a particularly preferred embodiment, the optical fiber is configured to be transparent and/or water-clear—preferably also in the coupling-out zone and/or trans-illumination zone. In this embodiment it is particularly preferred if an interior decoration, for example a picture, etc., is disposed on the side of the interior lighting facing away from the interior. It is also possible, for example, that the vehicle design of the rest of the interior is continued behind the interior lighting but visible through the interior lighting. This configuration provides an increased scope for design for the interior design when the interior lighting is deactivated.

In one embodiment, the at least one light source is configured as a light emitting diode (LED) or a plurality of light emitting diodes. LEDs can be used in various colors, for example, RGB-LEDs (red-green-blue LEDs) in order to produce various light colors in the optical fiber and therefore in the coupling-out zone, or organic light emitting diodes (OLED). In particular it is provided that a power supply to the light source or sources is provided in a concealed manner, in particular inside the inner trim in the area of the vehicle roof and/or the optical fiber.

A method is also provided for providing the interior lighting in the vehicle where the interior lighting. The method comprises the following steps: fabricating the optical fiber from the optical fiber material; lateral arrangement of the light sources on the optical fiber to form the lighting device; rear-side arrangement of the auxiliary lighting on the optical fiber to form the auxiliary light; and integration of the lighting device and the auxiliary light in the vehicle.

A vehicle is also provided having at least one such interior lighting as described previously.

BRIEF DESCRIPTION OF THE DRAWINGS

The present invention will hereinafter be described in conjunction with the following drawing figures, wherein like numerals denote like elements, and:

FIG. 3 shows a schematic lengthwise section parallel to the vehicle longitudinal axis of the ceiling light in FIG. 1; and FIG. 4 shows a schematic of a ceiling light as a second embodiment.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
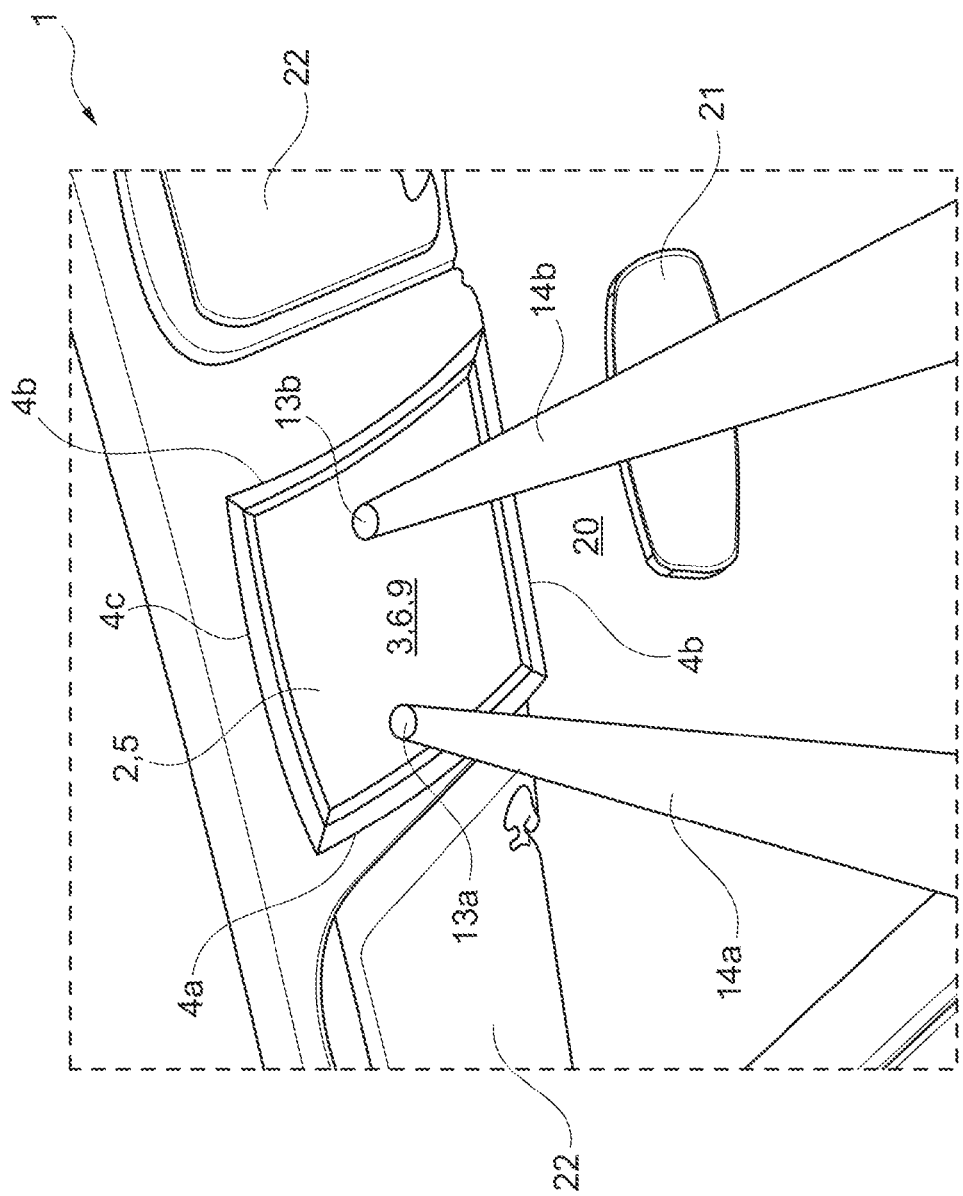
FIG. 1 shows a schematic view of a ceiling light of a vehicle as a first embodiment.

FIG. 1 shows in a schematic three-dimensional view a section of a vehicle roof 1 with a ceiling light 2, in English also called dome light. The ceiling light 2 is disposed adjacent to a windshield 20 on which a mirror 21 is glued. Two sun visors 22 are disposed perpendicular to the vehicle longitudinal axis and adjacent to the ceiling light 2. The ceiling light 2 has an underside 3 which forms a visible side and which is delimited laterally by side regions 4a, 4b, 4c, 4d. The visible side delimited by the side regions 4a, 4b, 4c, 4d is rectangular or square in plan view and has side lengths of, for example, approximately 10 cm-approximately 30 cm. The main body 5 of the ceiling light 2 comprising the side regions 4a, 4b, 4c, 4d and the underside 3 is configured as an optical fiber 6. In particular, the underside 3 is provided all over by the optical fiber 6, which enables light to be emitted into the interior distributed extensively over the entire underside 3.

Figure 2:
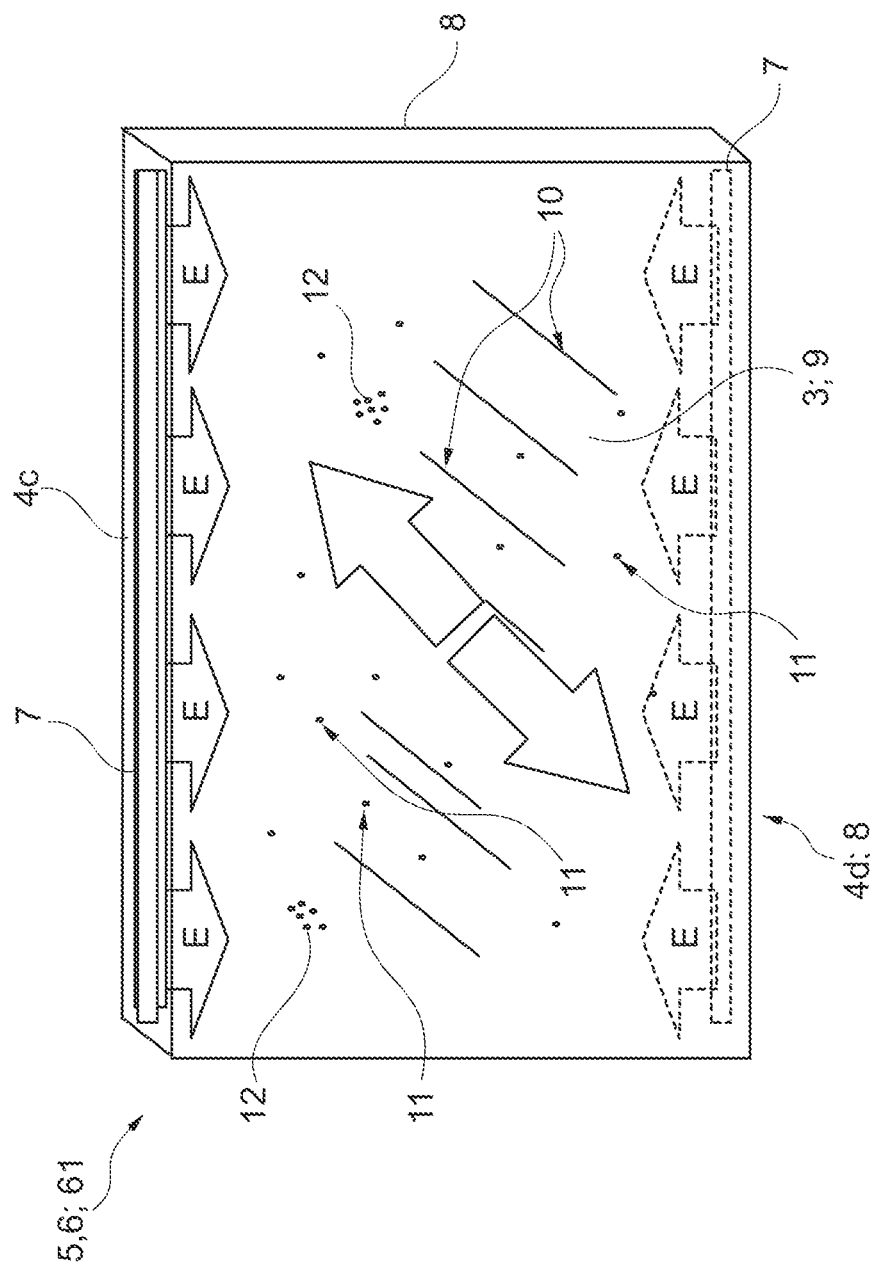
FIG. 2 shows a schematic view of the lighting device of the ceiling light.

In order to describe the optical fiber 6, its mode of operation, and possible configurations, reference is made to FIG. 2 which shows the optical fiber 6 from FIG. 1 as a schematic perspective diagram. The optical fiber 6 consists of polymethylmethacrylate (PMMA), a transparent light-conducting thermoplastic, as optical fiber material 61. The optical fiber material 61 has a plate thickness of preferably approximately 0.1 to approximately 20 mm, in particular of approximately 1 to approximately 15 mm. A first possible light source 7 is arranged and formed at the front on the side region 4c, another possible light source 7 is arranged and formed at the front on the side region 4d, to produce light and couple this into the optical fiber 6. The light sources 7 are, for example, configured as LED lights where each light source 7 is formed by a plurality of LEDs. The LEDs of one light source can be single-colored in order, for example to emit only white light into the interior or couple it into the optical fiber 6. Alternatively, the LEDs can also be multi-colored in order to illuminate the ceiling light 2 with different colors.

An optionally provided reflecting coating 8 on the rear side directed toward the vehicle roof, not visible in FIG. 2 ensures that the coupled-in light cannot escape from the optical fiber 6 at the rear. On the contrary, the light coupled into the optical fiber 6 is reflected back into the optical fiber 6. The reflecting coating 8 can optionally be interrupted.

The light is coupled into the optical fiber 6a from the light sources 7 in a coupling-in direction E at the front on the side regions 4c and 4d and is passed further via total reflection to the boundary surfaces of the optical fiber 6. In a coupling-out zone 9, which extends over the entire underside 3 of the optical fiber 6 and therefore over an area of more than approximately 200 cm$^2$, the light is coupled out extensively into the interior.

A coupling-out structure 10, which is formed on the underside 3, e.g., in the form of a prism structure or roughenings, can optionally be introduced into the optical fiber 6. Additionally or alternatively to the coupling-out structure 10, volume scatterers 11 can be integrated in the optical fiber 6, which are formed, for example, by nanoparticles having an arithmetic mean diameter of less than approximately 500 nm, preferably less than approximately 300 nm. Such nanoparticles are, for example, submicron and nanopowders which are added to a granular material of the optical fiber material 61 before the injection molding of the optical fiber 6 or in the semi finished product before the forming. In an alternative exemplary embodiment the volume scatterers 11 are formed by air inclusions and/or pigments, e.g., titanium (IV) oxide having an arithmetic mean diameter of less than approximately 3 mm, preferably less than approximately 1 mm. It is also possible that the optical fiber 6 is colored, so that the coupled-out light acquires a desired light color.

The coupling-out structure 10 and/or the volume scatterers 11 are configured to deflect light coupled into the optical fiber 6 and, for example, to scatter, for example, according to the Rayleigh and/or Mie theory and/or geometric optics in order to couple it out extensively from the coupling-out zone 9 so that the interior of the vehicle is lit or illuminated extensively. Optionally additionally to the coupling-out structure 10 and/or the volume scatterers 11, scattering centers 12 are integrated in the optical fiber 6. These scattering centers 12 are formed by an accumulation of nanoparticles and/or pigments in certain regions of the optical fiber 6. In an alternative embodiment the scattering centers 12 are formed by the coupling-out structure 10, where the coupling-out structure 10 is introduced according to its function, e.g., as a lens into the optical fiber material 61. The scattering centers 12 are configured to produce a directional or concentrated irradiation of light from the coupling-out zone 9 in addition to the extensive irradiation or instead of this. Certain regions of the interior can thus be illuminated specifically and/or in a focused manner in addition to the extensive illumination. The ceiling light 2 or the optical fiber 6 is either manufactured as a three-dimensional injection molded part or as a formed part, e.g., formed from a plate article.

It can be deduced from FIG. 1 that the coupling-out zone 9 extends all over the underside 3 between the side regions 4a, b, c, d and enables extensive lighting of the underside 3. In addition to the extensive lighting the ceiling light 2 has trans-illumination zones 13a, 13b through which an auxiliary light 14a, 14b is directed, which is configured as a directional, spherical reading light 14a, 14b. The structure of the ceiling lighting 2 with reading lighting is explained by reference to FIG. 3 which shows a schematic lengthwise section through the ceiling lighting 2.

The plate-like optical fiber 6 can again be seen in FIG. 3. One light source 7 each is arranged on at least one front side, here on two front sides and optionally on three or four front sides of the side regions 4a, 4b, 4c, and 4d. Through the light source 7, light is coupled into the optical fiber 6 in the manner described and radiated diffusely by volume scatterers 11 in the direction of the interior.

In addition to the light sources 7, reading lamps 15 are placed on the rear side of the optical fiber 6, which transilluminate the optical fiber 6 in the area of the trans-illumination zones 13a, 13b and transmit the reading lighting 14a, 14b into the interior. In this structure use is made of the fact that despite the volume scatterers 11, the optical fiber 6 is largely transparent or even water-clear so that the reading lighting 14a, 14b can pass unhindered or almost unhindered through the optical fiber 6. From the side of the user on the other hand, the ceiling lighting 2 is shown as undivided in the area of the trans-illumination zones 13a, 13b, in particular no lines of intersection or other subdivisions can be seen. For example, the underside 3 can be smooth or homogeneous.

The ceiling lighting 2 now allows four different operating modes: Deactivated operating mode: In this mode both the light sources 7 and the reading lamps 15 are deactivated so that the ceiling lighting 2 is switched off. Interior illumination: In this operating state only the light sources 7 are activated and the reading lamps 15 are deactivated so that the ceiling lighting 2 is perceived by the user as homogeneously illuminated in the entire coupling-out zone 9 or in the entire underside 3 of the ceiling lighting 2. Reading mode: In this mode the light sources 7 are deactivated and the reading lamps 15 are activated so that one or both reading lighting 14a, 14b selectively illuminate the interior. Complete lighting: In this mode both the light sources 7 and the reading lamps 15 are activated so that both an illumination of the interior and a selective lighting by the reading lighting 14a, 14b is accomplished. In summary, the ceiling lighting 2 allows a very homogeneous illumination of the interior over a large area and alternatively or additionally the activation of reading lamps 15, where, when viewed constructively, the reading lamps 15 are not perceptible from the interior in the deactivated state.

A second exemplary embodiment of a ceiling lighting 2 can be seen in FIG. 4, where control buttons 16 are integrated inside the coupling-out zone 9. The control buttons 16 can, for example, be used to activate the reading lamps 15 (not shown) which in turn transmit reading lighting 14a, 14b through trans-illumination zones 13a, 13b. In this exemplary embodiment the coupling-out zone 9 overlaps with the trans-illumination zones 13a, 13b. Optionally, in addition, further coupling-out zones 9, coupling-out structures 10, or scattering centers 12 can be disposed on the ceiling lighting 2 in order to achieve further optical effects.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A lighting for a vehicle comprising:
   a coupling-out zone for illumination of an interior of the vehicle;
   a lighting device that comprises:
      a light source that is configured to produce a light; and
      an optical fiber that is configured to couple in the light and further configured to couple out the light extensively in the coupling-out zone, and
   an auxiliary lighting configured to produce an auxiliary light and further configured to illuminate the interior of the vehicle,
   wherein the auxiliary lighting is configured to emit the auxiliary light starting from a side of the optical fiber facing away from the vehicle interior in a trans-illumination zone through the optical fiber into the interior; and
   wherein the side of the optical fiber facing away from the vehicle interior includes a reflective coating facing toward the vehicle interior, the reflective coating having an opening adjacent the trans-illumination zone.

2. The interior lighting according to claim 1, wherein the auxiliary lighting is configured to emit the auxiliary light through the coupling-out zone into the interior and the coupling-out zone overlap.

3. The interior lighting according to claim 1, wherein the auxiliary lighting is configured to emit the auxiliary light through the coupling-out zone into the trans-illumination zone and the coupling-out zone overlap.

4. The interior lighting according to claim 1, wherein the optical fiber is plate-like in the trans-illumination zone.

5. The interior lighting according to claim 1, wherein the optical fiber is plate-like in the coupling-out zone.

6. The interior lighting according to claim 1, wherein the auxiliary lighting is disposed on a rear side of the optical fiber.

7. The interior lighting according to claim 1, wherein the auxiliary lighting is configured as a reading lamp.

8. The interior lighting according to claim 7,
   wherein the optical fiber forms a main body of a ceiling lighting,
   wherein the coupling-out region forms at least approximately 70% of a visible surface of the ceiling lighting.

9. The interior lighting according to claim 7,
   wherein the optical fiber forms a main body of a ceiling lighting,
   wherein the coupling-out region forms at least approximately 80% of a visible surface of the ceiling lighting.

10. The interior lighting according to claim 7,
    wherein the optical fiber forms a main body of a ceiling lighting,
    wherein the coupling-out region forms at least approximately 90% of a visible surface of the ceiling lighting.

11. The interior lighting according to claim 1, wherein the optical fiber comprises a coupling-out structure introduced into an optical fiber material, which is configured to scatter the light for coupling out extensively in the coupling-out zone.

12. The interior lighting according to claim 1, wherein the optical fiber comprises a coupling-out structure introduced into a volume scatterer integrated in an optical fiber material, which is configured to scatter the light for coupling out extensively in the coupling-out zone.

13. The interior lighting according to claim 12, wherein the volume scatterer integrated in the optical fiber material is formed by nanoparticles having an average diameter of less than approximately 500 nm.

14. The interior lighting according to claim 12, wherein the volume scatterer integrated in the optical fiber material is formed by nanoparticles having an average diameter of less than approximately 300 nm.

15. The interior lighting according to claim 12, wherein volume scatterers integrated in the optical fiber material are formed by air inclusions having an average diameter of less than approximately 3 mm.

16. The interior lighting according to claim 12, wherein volume scatterers integrated in the optical fiber material are formed by air inclusions having an average diameter of less than approximately 1 mm.

17. The interior lighting according to claim 12, wherein the coupling-out structure introduced into the optical fiber material is formed by notches on an underside on at least one front sides of the optical fiber.

18. The interior lighting according to claim 12, wherein at least one scattering centers is introduced into the optical fiber in order to achieve a concentration of the light in the interior in addition to coupling-out of the light.

19. The interior lighting according to claim 1, wherein coupling-out zones have an area of at least approximately 50 $cm^2$.

20. A method for preparing an interior lighting in a vehicle, comprising:
fabricating an optical fiber from an optical fiber material;
laterally arranging light sources on the optical fiber to form a lighting device;
rear-side arranging auxiliary lighting on the optical fiber to form an auxiliary light; and
integrating the lighting device and the auxiliary light in the vehicle;
wherein a side of the optical fiber facing away from the vehicle interior includes a reflective coating facing toward the vehicle interior, the reflective coating having an opening adjacent a trans-illumination zone.

* * * * *